US012344507B2

(12) United States Patent
Yulkowski

(10) Patent No.: US 12,344,507 B2
(45) **Date of Patent: *Jul. 1, 2025**

(54) SURFACE MOUNTED DOOR FRAME

(71) Applicant: TD IP HOLDCO, LLC, Waterford, MI (US)

(72) Inventor: Patricia Yulkowski, Pontiac, MI (US)

(73) Assignee: TD IP HOLDCO. LLC, Waterford, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,374

(22) Filed: Jun. 26, 2023

(65) Prior Publication Data

US 2023/0416054 A1 Dec. 28, 2023

Related U.S. Application Data

(63) Continuation of application No. 17/087,317, filed on Nov. 2, 2020, now Pat. No. 11,708,243, which is a continuation of application No. 16/286,472, filed on Feb. 26, 2019, now Pat. No. 10,858,220.

(51) Int. Cl.
*B66B 13/24* (2006.01)
*E06B 5/16* (2006.01)

(52) U.S. Cl.
CPC ................ *B66B 13/24* (2013.01); *E06B 5/16* (2013.01)

(58) Field of Classification Search
CPC ... E06B 5/16; E06B 5/06; B66B 13/24; B66B 13/00; B66B 13/30; B66B 13/306; B66B 13/308
See application file for complete search history.

(56) References Cited

U.S. PATENT DOCUMENTS

| | | | | |
|---|---|---|---|---|
| 2,435,779 | A | 2/1948 | Guilbert, Jr. | |
| 4,748,771 | A * | 6/1988 | Lehnert | E06B 5/16 428/920 |
| 4,937,978 | A * | 7/1990 | Johansson | E06B 3/827 49/501 |
| 5,836,424 | A * | 11/1998 | Allen | B66B 13/30 49/120 |
| 7,621,083 | B2 | 11/2009 | Smith | |
| 10,087,674 | B2 * | 10/2018 | Rochon | E06B 1/60 |
| 10,858,220 | B2 | 12/2020 | Yulkowski | |
| 11,708,243 | B2 | 7/2023 | Yulkowski | |
| 2005/0098388 | A1 | 5/2005 | Studhalter | |
| 2005/0193652 | A1 | 9/2005 | Cornell | |

(Continued)

OTHER PUBLICATIONS

U.S. Appl. No. 16/286,472, filed Jun. 30, 2020.

(Continued)

*Primary Examiner* — Paola Agudelo
(74) *Attorney, Agent, or Firm* — EVAN LAW GROUP LLC

(57) ABSTRACT

A door frame system comprises a wall and a door frame. The door frame comprises a sub-buck portion and a shell portion, coupled to the sub-buck portion. The sub-buck portion comprises a sub-buck mounting arm including at least one mounting aperture, a sub-buck rabbet arm coupled to one end of the sub-buck mounting arm and a sub-buck support arm coupled to the sub-buck mounting arm opposite the sub-buck rabbet arm. The sub-buck portion is surface mounted to a single surface of the wall through the at least one mounting aperture.

18 Claims, 8 Drawing Sheets

(56) References Cited

U.S. PATENT DOCUMENTS

| | | | | |
|---|---|---|---|---|
| 2006/0048466 | A1* | 3/2006 | Darnell | E06B 1/32 52/204.1 |
| 2006/0175147 | A1* | 8/2006 | Morotome | B66B 13/308 187/400 |
| 2006/0207199 | A1* | 9/2006 | Darnell | E06B 5/16 52/232 |
| 2010/0083598 | A1* | 4/2010 | Smith | E06B 1/18 52/213 |
| 2014/0047785 | A1* | 2/2014 | Wilkinson | E06B 5/161 52/232 |
| 2015/0135696 | A1 | 5/2015 | Cooper | |
| 2018/0119472 | A1* | 5/2018 | Hucker | E05F 15/63 |
| 2019/0336801 | A1* | 11/2019 | Edwards | E06B 9/17007 |

OTHER PUBLICATIONS

U.S. Appl. No. 16/286,472, filed Jul. 16, 2020.
U.S. Appl. No. 16/286,472, filed Sep. 18, 2020.
U.S. Appl. No. 17/087,317, filed Apr. 22, 2022.
U.S. Appl. No. 17/087,317, filed Jun. 28, 2022.
U.S. Appl. No. 17/087,317, filed Dec. 15, 2022.
U.S. Appl. No. 17/087,317, filed Mar. 8, 2023.
American National Standard ANSI/SDI A250.7-1997, "Nomenclature for: Standard Steel Doors and. Frames", Steel Door Institule, pp. 1-21, (1997).
Technical Data Series SDI 118-01, "Basic Fire Door Requirements", Steel Door Institute, pp. 1-9, found at www.steeldoor.org/res/118.pdf, (2001).
Total Door Systems, "Total Door Systems Product Guide", available online at www.totaldoor.com/product-guide/ (2015).
"NFPA 80 Standard for Fire Doors and Other Opening Protectives", National Fire Protection Association, pp. 80-81-80-95, (2016).
"NFPA 105 Standard for Smoke Door Assemblies and Other Opening Proteclives", National Fire Protection Association, pp. 105-1-105-23, (2016).
Greene, L., "Questions about fire doors: Everything you always wanted to know", found at www.constructionspecifier.com/questions-about-fire-doors-everything-you-always-wanted-to-know-but-were-afraid-to-ask/, pp. 1-8, (2013).
UL Product Category, "Fire Doors, GSNV". UL Product Spec, pp. 1-4, (2012).
Technical Data Series SDI 111-09, "Recommended details for Standard Steel Doors, Frames, Accessories and Related Components", found at https://www.steeldoor.org/wp-content/uploads/2020/02/SDI_111-1.pdf. 23 pages. (2014).
Product description "SafeFrame", Total Door Systems, 3 pages, (Jul. 1, 2020).
Technical Data Sheet #6C, "Safeframe", Total Door Systems, 1 page, Jan. 6, 2021.
Product Information Sheet "Safeframe", Total Door Systems, pp. 1-6, Jul. 14, 2020.

* cited by examiner

SURFACE MOUNTED DOOR FRAME

BACKGROUND

Elevators include a car (also known as a cab) for transporting people or goods between two or more floors of a structure through a shaft (also known as a hoistway). Elevators enhance the convenience and accessibility of multi-story structures, and are a necessity in high-rise buildings such as skyscrapers. However, elevator shafts can become significant hazards in the event of a fire. Elevator shafts provide a fluid connection between floors of a structure, which allows air to travel between floors to fuel the fire and provides a pathway for smoke to spread throughout the structure.

Many building codes, such as the International Building Code, the Uniform Building Code and the International Fire Code, specify regulations to minimize the risks posed by elevator shafts during a fire. These codes often require that buildings include fire safety systems that automatically seal off openings to elevator shafts during a fire. Sealing off openings to elevator shafts reduces the airflow to a fire to prevent the fire from growing, and prevents smoke from spreading to unaffected floors of a building. Examples of fire safety systems include physical barriers such as fire curtains and fire doors.

Fire doors are doors that are formed from fire-resistant materials and that automatically close in the event of a fire to seal off elevator shafts. A fire door assembly includes one or more fire doors mounted to a fire-resistant door frame. The fire-resistant door frame is mounted to a wall near an elevator shaft.

A fire door frame must withstand the extreme conditions that are created by a fire. The high temperatures during a fire can deform or warp the metal of the frame. The load of the fire door on the frame can lead to torsion of the frame, resulting in the frame being pried away from the wall where it is mounted. In addition, a hot metal frame is subject to deformation due to the rapid cooling that occurs when water from, a sprinkler system or a firefighters hose contacts the frame. These actions can result in the failure of a fire door assembly during a fire, which can lead to greater structural damage and increased risk of harm to the occupants of the building.

SUMMARY

In a first aspect, the invention is a door frame system comprising a wall and a door frame. The door frame includes (i) a sub-buck portion and (ii) a shell portion coupled to the sub-buck portion. The sub-buck portion includes a sub-buck mounting arm including at least one mounting aperture, a sub-buck rabbet arm coupled to one end of the sub-buck mounting arm, and a sub-buck support arm coupled to the sub-buck mounting arm opposite the sub-buck rabbet arm. The sub-buck portion is sur face mounted to a single surface of the wall through the at least one mounting aperture.

In a second aspect, the invention is a surface mounted door frame kit comprising (a) a sub-buck portion and (b) a shell portion. The sub-buck portion includes a sub-buck mounting arm having at least one mounting aperture, a sub-buck rabbet arm coupled to one end of the sub-buck mounting arm, and a sub-buck support arm coupled to the sub-buck mounting arm opposite the sub-buck rabbet arm. The shell portion includes a shell support arm, a facing arm coupled to the shell support arm, a shell rabbet arm coupled to the facing arm, a stop coupled to the shell rabbet arm, a soffit coupled to the stop, a return coupled to the soffit, and a backbend coupled to the return. The shell portion is configured to fit around the sub-buck portion to form an enclosed quadrilateral when coupled.

In a third aspect, the invention is a sub-buck portion of a door frame consisting of a sub-buck mounting arm having at least one mounting aperture, a sub-buck rabbet arm coupled to one end of the sub-buck mounting arm, and a sub-buck support arm coupled to the sub-buck mounting arm opposite the sub-buck rabbet arm. The sub-buck mounting arm is capable of being surface mounted to a single surface of a wall.

In a fourth aspect, the invention is a shell portion of a door frame consisting of a shell support arm, a facing arm coupled to the shell support arm, a shell rabbet arm coupled to the facing arm, a stop coupled to the shell rabbet arm, a soffit coupled to the stop, a return coupled to the soffit, and a backbend coupled to the return. The shell rabbet arm and the stop define a rabbet.

In a fifth aspect, the invention is a fire door assembly comprising a fire rated door frame, a fire rated hinge coupled to the fire rated door frame, and a fire rated door coupled to the fire rated hinge. The fire rated door frame includes (1) a sub-buck portion and (2) a shell portion coupled to the sub-buck portion. The sub-buck portion includes a sub-buck mounting arm including at least one mounting aperture, a sub-buck rabbet arm coupled to one end of the sub-buck mounting arm, and a sub-buck support arm coupled to the sub-buck mounting arm opposite the sub-buck rabbet arm. The sub-buck portion is capable of being surface mounted to a single surface of a wall through the at least one mounting aperture.

Definitions

The term "fire rated" means that a component has been approved to withstand fire for a fixed amount of time.

The term "fire listed" means that a component has been tested and approved by a recognized listing organization to withstand fire for a fixed amount of time.

The term "fire labeled" means that a component has a visible label indicating that it has been tested and approved by a recognized listing organization to withstand fire for a fixed amount of time.

The term "surface mounted" means a door frame that abuts a single surface of a wall. The door frame, when mounted, extends perpendicularly from the wall.

BRIEF DESCRIPTION OF THE DRAWINGS

The invention can be better understood with reference to the following drawings and description.

DETAILED DESCRIPTION

Figure 1:
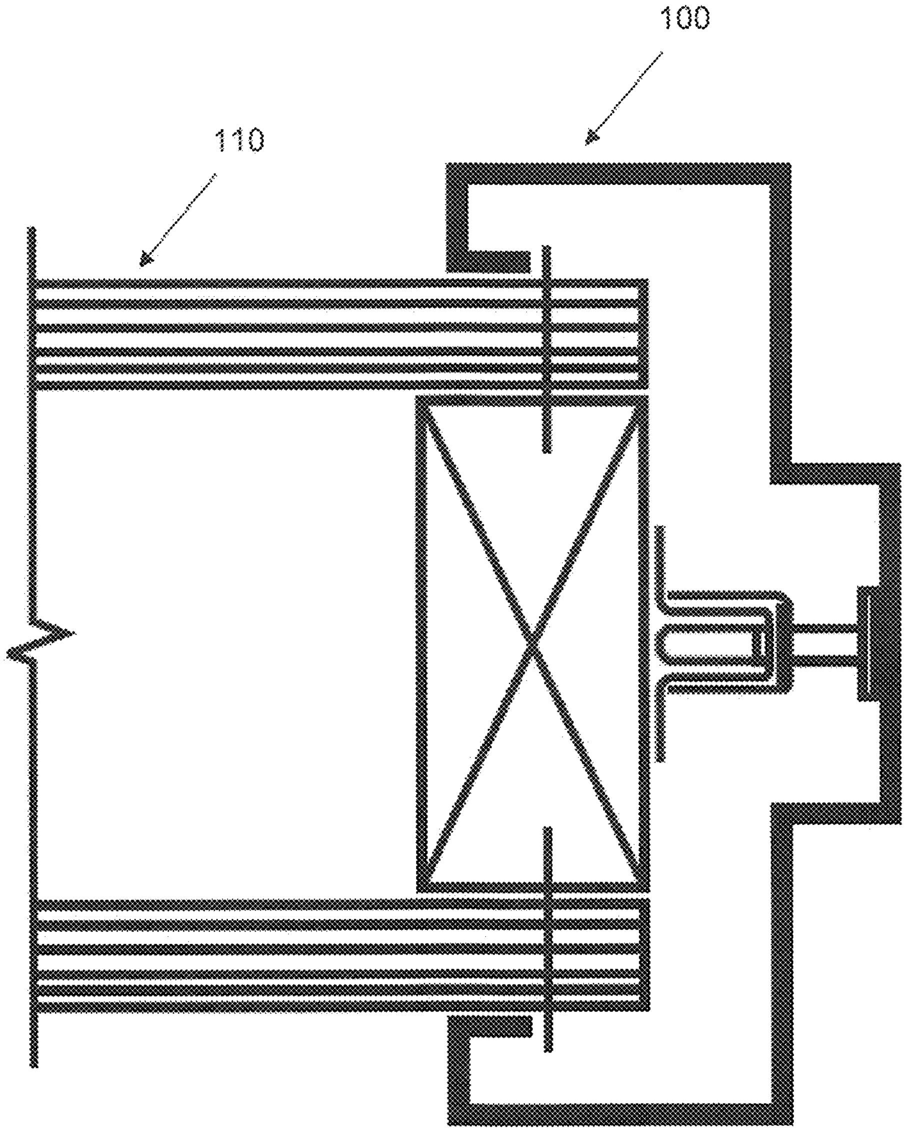
PRIOR ART FIG. 1
FIG. 1 illustrates a sectioned view of a conventional door frame coupled to a wall.

Conventional, door frames are roughly U-shaped in cross-section and are configured to be mounted around three sides of an opening in a wall. FIG. 1 illustrates a sectioned view of a conventional door frame 100 coupled to a wall 110, This design is problematic for fire door frames intended for use with elevator shafts since the opening in the wall is occupied by the elevator door assembly. As a result, elevator fire door frames require the construction of an additional wall, known as a protruding or stub wall, that extends from one of the walls near the elevator shaft to provide the three necessary points of attachment.

The protruding walls required by conventional fire door frames impose a number of costs and constraints on building owners. Protruding walls increase the costs of construction due to the need for additional materials and labor. Protruding walls also impact the design and aesthetics of buildings since they reduce the open space in elevator lobbies.

The present invention is a door frame that is capable of being surface mounted to a single surface of a wall. The door frame includes a sub-buck portion, for coupling the frame to the wall, and a shell portion, coupled to the sub-buck portion, for supporting a door. When used as a fire door frame, this design eliminates the need for a protruding wall. Eliminating the protruding wall reduces the cost and complexity of construction, provides more space in elevator lobbies and expands the design options available to architects and designers.

Surface mounted fire door frames offer a number of advantages as compared to conventional fire door frames that require three mounting surfaces. The sub-buck portion and the shell portion may be formed from thicker gauge steel, which increases the rigidity of the frame and increases its resistance to warpage. The use of thicker gauge steel also reduces the mechanical advantage of the sub-buck portion and the shell portion. Eliminating the need for three distinct attachment points also allows for a frame design that improves the performance of a fire rated door frame. The design of the sub-buck portion reduces the amount of the sub-buck that lacks support as compared to conventional fire door frames. The shell portion features more bends than a conventional fire door frame, which increases the strength of the frame at the critical point where the door is coupled to the frame and the load is the greatest. The overall design of the frame reduces the cantilever effect due to torsion and protects the frame from deformation during cooling. In addition, the design provides for more material overlap, which provides increased rigidity and reduced flexibility.

Figure 2:
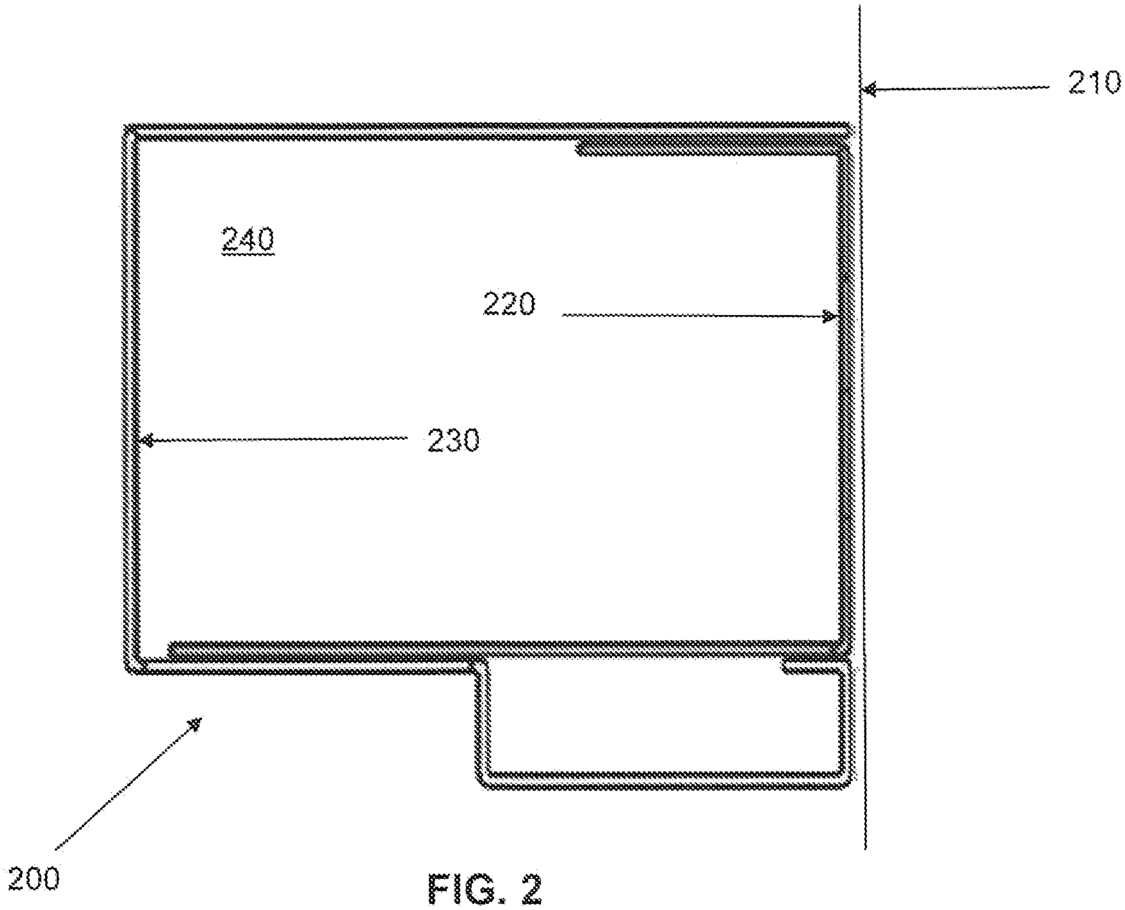
FIG. 2 illustrates a sectioned view of a surface mounted door frame coupled to a wall.

FIG. 2 illustrates a sectioned view of a surface mounted door frame 200 coupled to a wall 210. The frame includes a sub-buck portion 220, coupled to the wall, and a shell portion 230, coupled to the sub-buck portion. When coupled, the sub-buck portion and the shell portion together define an enclosed quadrilateral 240. A door (not shown) may be coupled to the shell portion.

Figure 3:
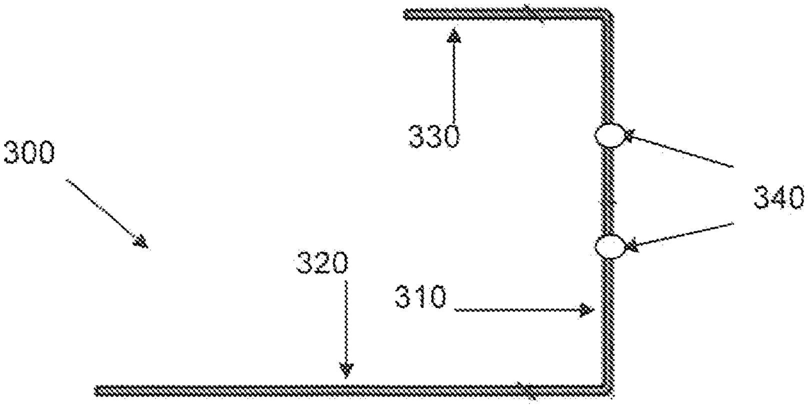
FIG. 3 illustrates a sectioned view of a sub-buck portion of a surface mounted door frame.

FIG. 3 illustrates a sectioned view of a sub-buck portion 300 of a surface mounted door frame. The sub-buck portion includes a sub-buck mounting arm 310, a sub-buck rabbet arm 320, coupled to one end of the sub-buck mounting arm, and a sub-buck support arm 330, coupled to the sub-buck mounting arm opposite the sub-buck rabbet arm. Preferably, the sub-buck portion includes a single sub-buck mounting arm. The sub-buck rabbet arm and the sub-buck support arm abut a shell rabbet arm and a shell support arm, respectively, of a corresponding shell portion (not shown). The sub-buck rabbet arm and the sub-buck support arm may be the same length, or may have different lengths. The sub-buck mounting arm may optionally include one or more mounting apertures 340 for securing the sub-buck portion to a wall (not shown). When coupled to a wall, the sub-buck rabbet arm and the sub-buck support arm extend away from the wall.

Figure 4:
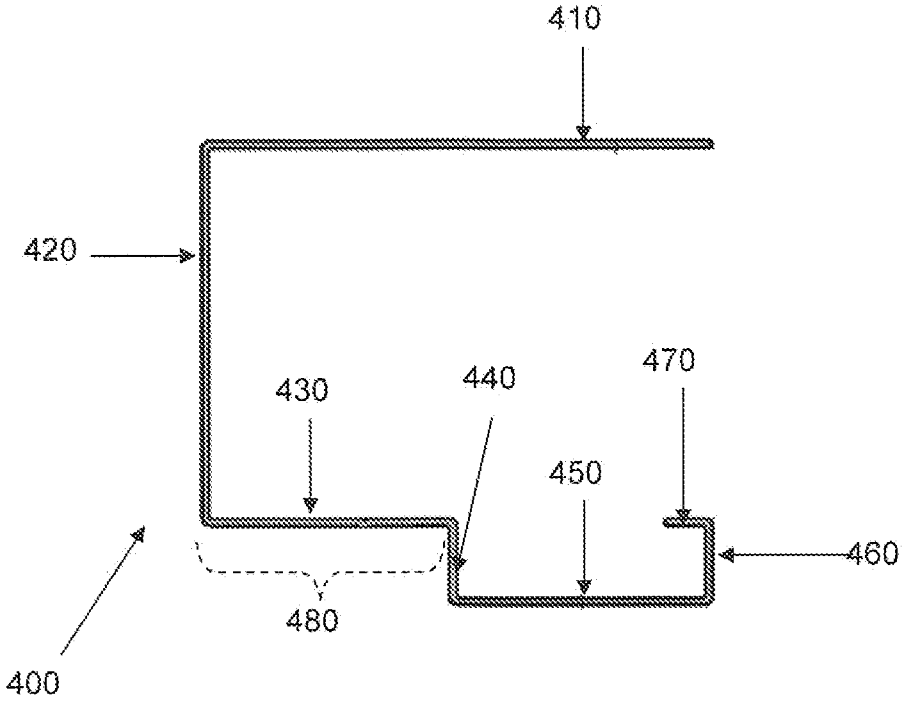
FIG. 4 illustrates a sectioned view of shell portion of a surface mounted door frame.

FIG. 4 illustrates a sectioned view of a shell portion 400 of a surface mounted for frame. The shell portion includes a shell support arm 410, a facing arm 420, coupled to the shell support arm, a shell rabbet arm 430, coupled to the facing arm, a stop 440, coupled to the shell rabbet arm, a soffit 450, coupled to the stop, a return 460, coupled to the soffit, and a backbend 470, coupled to the return. Preferably, the shell includes a single backbend and a single return. The shell rabbet arm and the shell support arm about a sub-buck rabbet arm and a sub-buck support arm, respectively, of a corresponding sub-buck portion (not shown). The shell rabbet arm and the stop together define a rabbet 480 for accepting a door (not shown). The shell portion contacts the surface of a wall (not shown) at the return.

The sub-buck portion and the shell portion may each independently be formed from any suitable metal or alloy. Examples of suitable metals and alloys include iron and its alloys, such as steel. Preferably, the sub-buck portion and the shell portion are each formed from steel. A particularly preferred type of steel is cold rolled steel. The metal used to form the sub-buck portion and the shell portion may have a thickness of 7, 8, 9, 10, 11, 12, 13, 14, 15, 16, 17, 18, 19, 20, 21 or 22 gauge. The sub-buck portion and the shell portion may have the same gauge, or may have different gauges. Preferably, the sub-buck portion has a thickness of at most 18 gauge, and the shell portion has a thickness of at most 21 gauge.

The sub-buck portion and the shell portion may be monolithic, or may be formed from multiple components. Preferably, the sub-buck portion and the shell portion are each monolithic.

Figure 8:
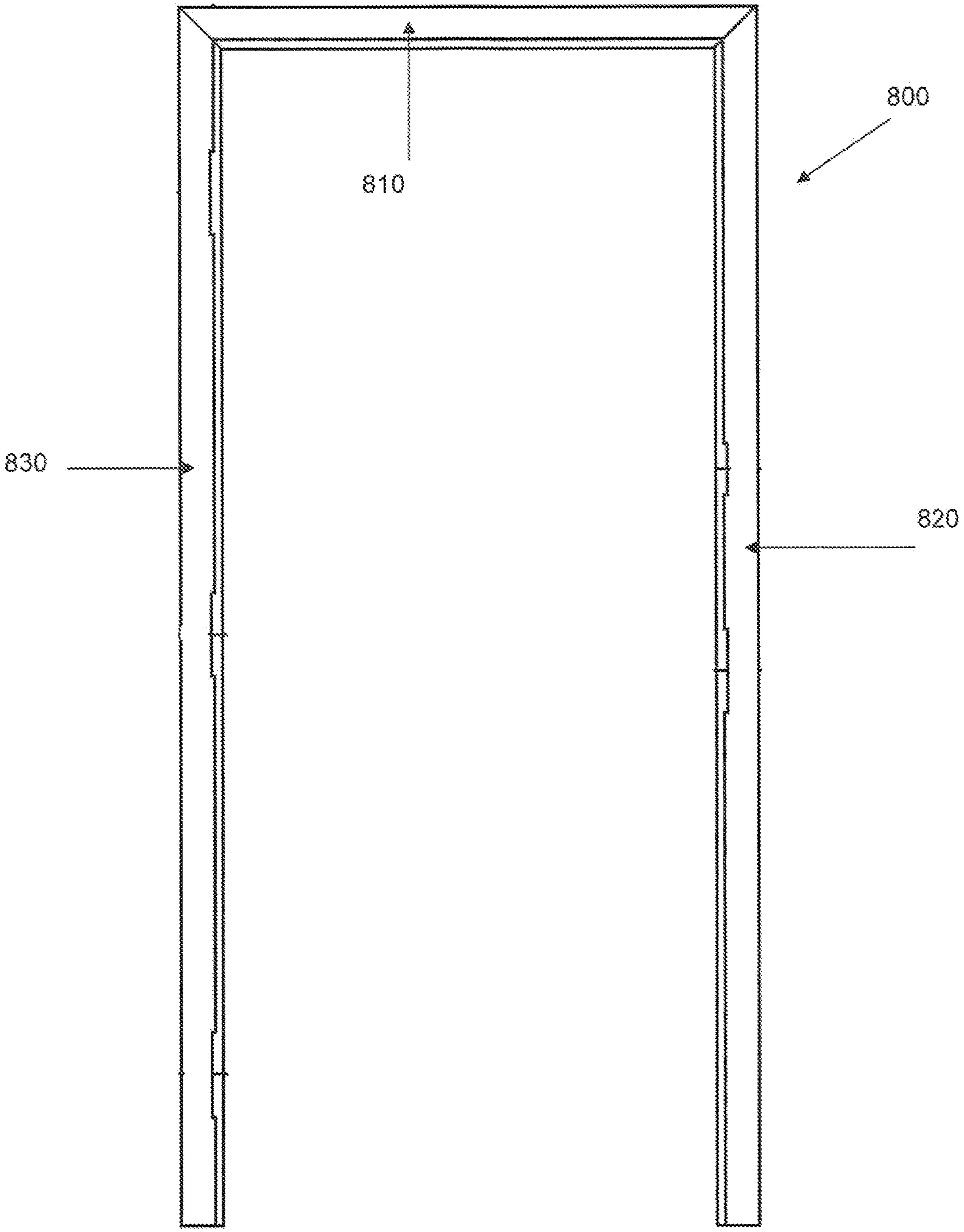
FIG. 8 illustrates an assembled door frame.

FIG. 8 illustrates an assembled door frame 800. The door frame includes a header 810, a strike jamb 828, coupled to one end of the header, and a hinge jamb 830, coupled to the header opposite the strike jamb. The door frame may be provided as a welded frame with the sub-buck portion and/or the shell portion pre-assembled to include the header, the strike jamb and the hinge jamb. Alternatively, the door frame may be provided as a knock down frame with the sub-buck portion and/or the shell portion provided as separate components to be assembled into the header, the strike jamb and the hinge jamb on site.

The door frame may optionally be a fire rated door frame, a fire listed door frame or a fire labeled door frame. Preferably, the door frame is a fire rated door frame. The fire door frame may be fire rated for up to 20 minutes. 30 minutes, ¾ hour, 1 hour, 1 hours, 3 hours or 4 hours (the fire rating may alternatively be reported using an equivalent one-letter rating, such as to indicate a fire rating of 3 hours). Preferably, the fire door frame is fire rated for up to 3 hours. The frame may comply with one or more standards for fire rated door frames authored by various standard-setting organizations. Examples of standard-setting organizations include the National Fire Protection Association (NFPA), the Steel Door Institute (SDI), Underwriters Laboratories (UL), the American National Standards Institute (ANSI), the American Society for Testing and Materials (ASTM), the Door & Hardware Institute (DHI), the Construction Specifications Institute (CSI), the Builders Hardware Manufacturers Association (81-IMA), Intertek (Warnock Hersey) and the Canadian Standards Association (CSA). Preferably, the frame complies with NFPA 80 Standard for Fire Doors and Other Opening Protectives.

Figure 5A:
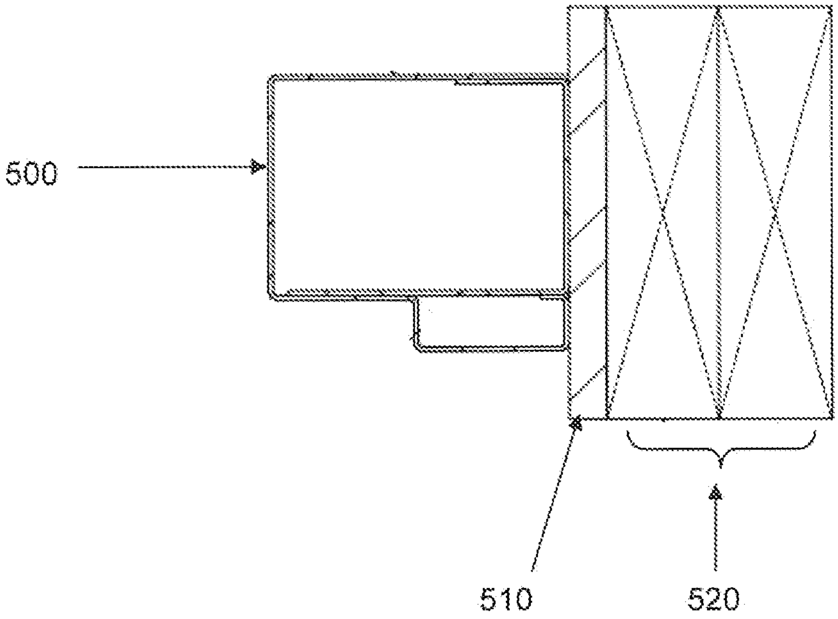
FIG. 5A is a sectioned view of a surface mounted door frame coupled to drywall supported by wood studs.
Figure 5B:
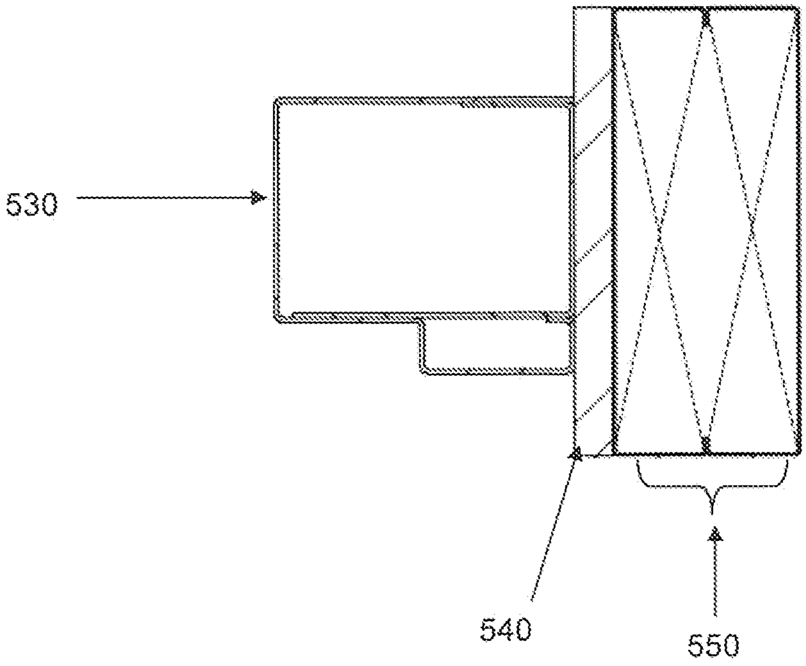
FIG. 5B is a sectioned view of a surface mounted door frame coupled to drywall supported by steel studs.
Figure 5C:
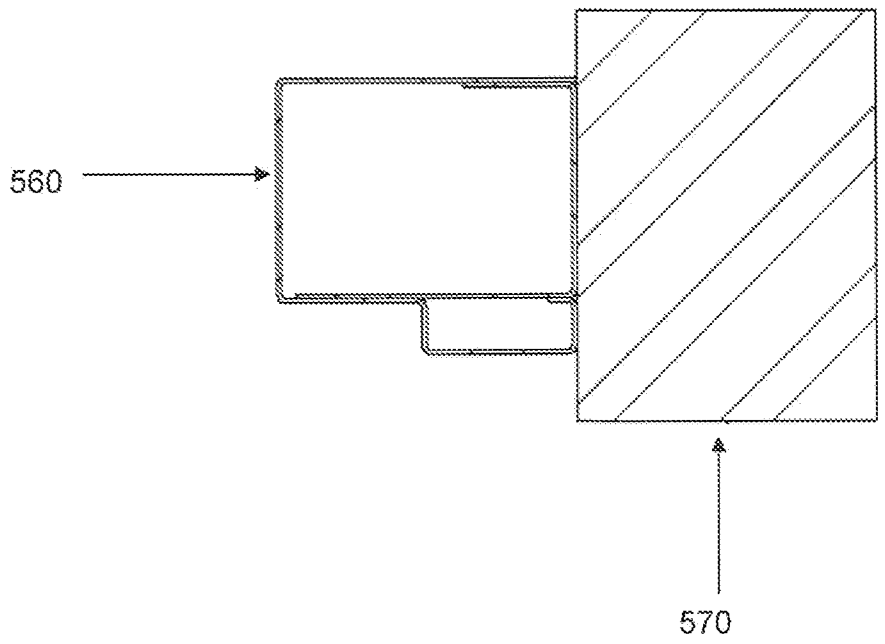
FIG. 5C is a sectioned view of a surface mounted door frame coupled to concrete.

The door frame may be coupled to any type of wall near an elevator shaft. For example, the wall may be drywall (gypsum), drywall supported by wood studs, drywall supported by metal studs, masonry, concrete, concrete block, brick, brick tile, stucco, precast gypsum tile, plaster, plaster on block, plaster on metal lath, solid plaster with gypsum board core, and combinations thereof. FIG. 5A is a sectioned view of a door frame 500 coupled to drywall 510 supported by wood studs 520. FIG. 5B is a sectioned view of a door frame 530 coupled to drywall 540 supported by steel studs 550. FIG. 5C is a sectioned view of a door frame 560 coupled to concrete 570. As shown in FIG. 5A-5C, the frame may be surface mounted to any type of wall used in construction. Preferably, the wall is a firewall.

The door frame may be coupled to a wall using any suitable fastener. Examples of suitable fasteners include screws, bolts and nails. Preferred fasteners include drywall screws, for coupling the frame to drywall, and masonry fasteners, for coupling the frame to masonry.

Figure 6:
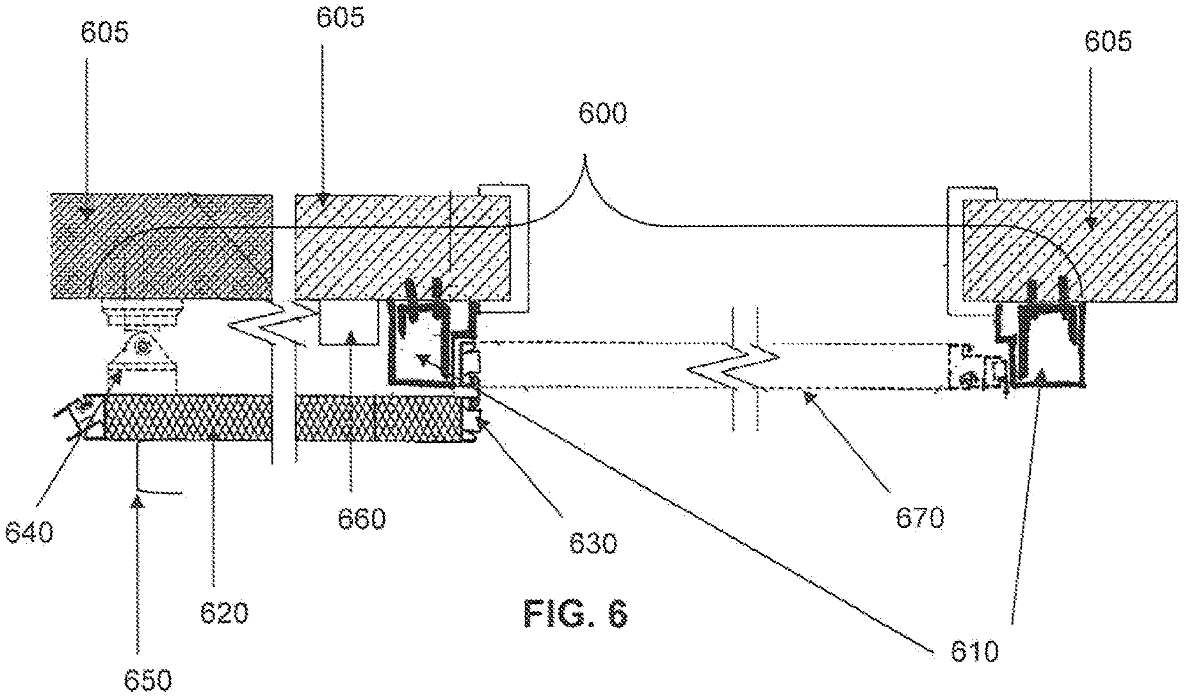
FIG. 6 is a schematic of a fire door assembly surface mounted to a wall.

FIG. 6 is a schematic of a fire door assembly 600 surface mounted to a wall 605. The fire door assembly includes a fire door frame 610 and a fire door 620. The door is coupled to the frame with a hinge 630. The door is maintained in an open position with a holder 640, coupled to the wall and removably coupled to the door. The door includes an operating grip 650, coupled to the door. The door may optionally include a second operating grip (not shown), coupled to the opposite side of the door. A closer 660 is coupled to the door and to the wall. The door is shown in a closed position at 670.

The fire door assembly may include one door or two doors. The door assembly may be configured to open the door 90 degrees or 180 degrees. The door assembly may be configured for a right hand reverse (RR) or a left hand reverse (LR) door.

The fire door may be formed from any suitable metal or alloy. Examples of suitable metals and alloys include iron and its alloys, such as steel. Preferably, the fire door is formed from steel. A particularly preferred fire door material is cold rolled steel.

The fire door may optionally be a fire rated door, a fire listed door or a fire labeled door. Preferably, the fire door is a fire rated door. The fire door may be fire rated for up to 20 minutes, 30 minutes, % hour, 1 hour, 1½ hours, 3 hours or 4 hours (the fire rating may alternatively be reported using an equivalent one-letter rating, such as "A" to indicate a fire rating of 3 hours). Preferably, the fire door is fire rated for up to 3 hours. The door, may optionally be a temperature rise door and may have a temperature-rise rating of 250° F., 450° F. or 650° F. The fire door may comply with one or more standards for fire rated doors authored by various standard-setting organizations, Examples of standard-setting organizations include the National Fire Protection Association (NEPA), the Steel Door Institute (SDI), Underwriters Laboratories (UL), the American National Standards Institute (ANSI), the American Society for Testing and Materials (ASTM), the Door & Hardware Institute (DHI), the Construction Specifications Institute (CSI), the Builders Hardware Manufacturers Association (BHMA), Intertek (Warnock Hersey) and the Canadian Standards Association (CSA), Preferably, the fire door complies with NFPA 80 Standard for Fire Doors and Other Opening Protectives.

The hinge may be formed from any suitable metal or alloy. Examples of suitable metals and alloys include iron and its alloys, such as steel. Preferably, the hinge is formed from steel. The hinge may extend along a portion of the frame, or along the full length of the frame. Preferably, the hinge is a fire rated hinge and is fire rated for up to 3 hours. An example of a suitable hinge is the continuous hinge from TOTAL DOOR SYSTEMS® (Waterford, MI).

The holder (also known as a hold open or a release) may be an electromagnetic holder. The electromagnetic holder is coupled to the same wall as the frame and is in electrical communication with the building power supply and the building fire or smoke detection system. Under normal operation, an electric current magnetically couples the holder to a magnet, such as the TDH 100 Electromagnetic Holder from TOTAL DOOR SYSTEMS® (Waterford, MI), coupled to the door. If the fire or smoke detection system is triggered, the electric current to the holder is stopped, which interrupts the magnetic coupling of the door to the holder and releases the door. The released door may then move to a closed position against the frame to seal the elevator shaft, An example of a suitable holder is the TDH 200 Electromagnetic Holder from TOTAL DOOR SYSTEMS® (Waterford, MI).

The operating grip may be coupled to one or both sides of the door to facilitate the manual movement of the door by a user. The operating grip may be formed from any suitable metal. Preferably, the operating grip is formed from steel. Preferably, the operating grip is a fire rated operating grip and is fire rated for up to 3 hours. Examples of suitable operating grips include the M32, M33, M35 and M52 grips from TOTAL DOOR SYSTEMS® (Waterford, MI).

The closer is coupled to the door and closes the door after the door has been released by the holder. Preferably, the closer is a fire rated closer and is fire rated for up to 3 hours. Examples of suitable closers include the TDC 96, TDC 96P, TDC 5051 and TDC 8907 closers from TOTAL DOOR SYSTEMS® (Waterford, MI).

The fire door assembly may optionally include additional fire and smoke prevention components. For example, a gasket or smoke seal may optionally be coupled to the frame. Similarly, a sweep may optionally be coupled to the bottom of the door. Preferably, any additional fire and smoke prevention components comply with the Underwriters Laboratories (UL) standards for fire doors.

The fire door assembly may be used with a passenger elevator or with a freight elevator. The fire door assembly may be included in any multi-story structure that contains an elevator. For example, the fire door assembly be included in an office building, hotel, condominium, apartment tower, hospital, factory, airport, train station, shopping mall, amusement park, casino or cruise ship.

EXAMPLES

Example 1—Sub-Buck Portion Comparative Test

The sub-buck portion of a surface mounted door frame (as shown in FIG. 3) was compared to a door frame configured to be mounted to three sides of a wall. The mechanical advantage of the sub-buck portion of the surface mounted door frame was reduced by 74% as compared to the existing fire door frame. This reduction in the mechanical advantage provides a substantially greater resistance to warpage.

Example 2—Shell Portion Comparative Test

The shell portion of a surface mounted door frame (as shown in FIG. 4) was compared to a door frame configured to be mounted to three sides of a wall. The mechanical advantage of the shell portion of the surface mounted door frame was reduced by 72.5% as compared to the existing fire door frame. This reduction in the mechanical advantage provides a substantially greater resistance to warpage.

Example 3—Attachment Point Comparison

Figure 7:
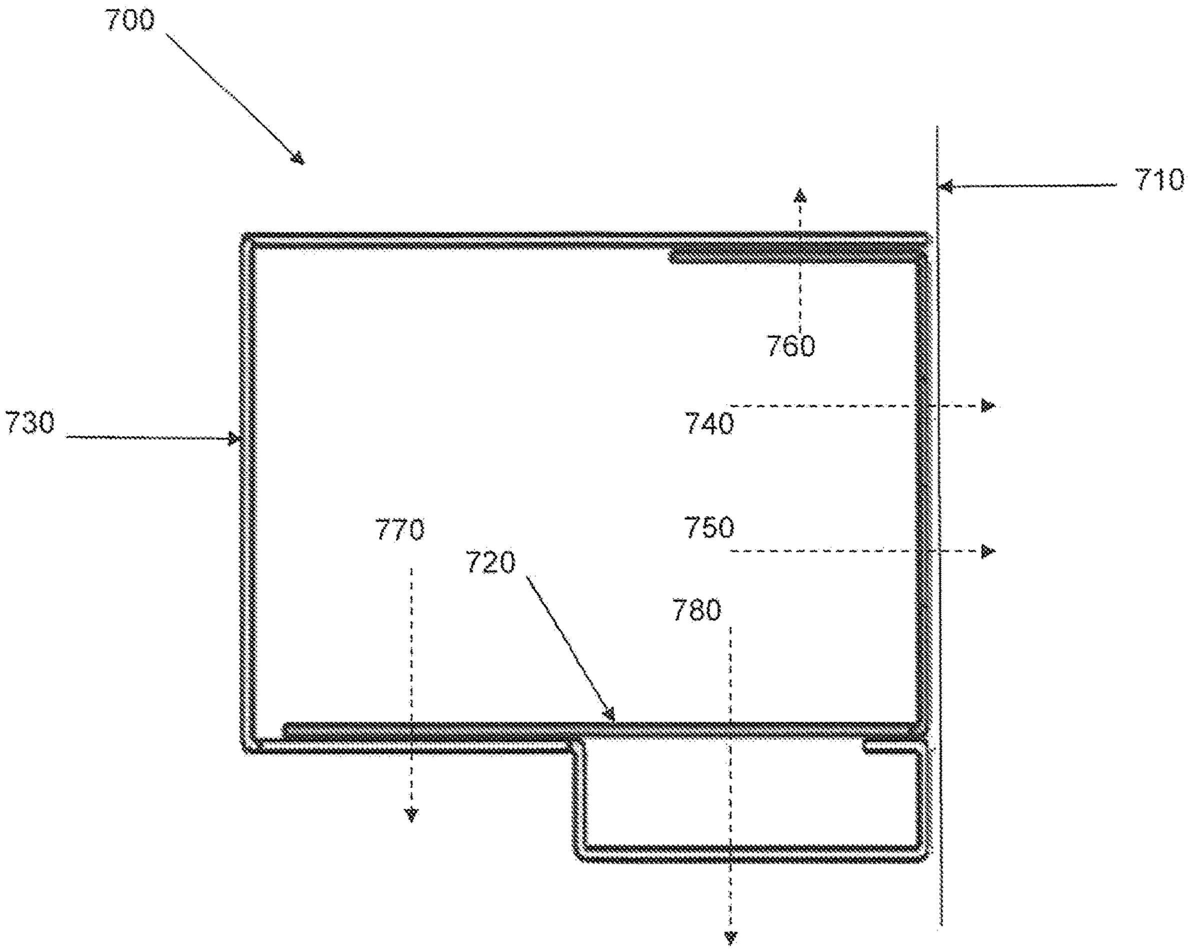
FIG. 7 illustrates a sectioned view showing the attachment points for a surface mounted door frame coupled to a wall.

The attachment points for a surface mounted door frame were compared to the attachment points for a door frame configured to be mounted to three sides of a wall. FIG. 7 illustrates a sectioned view showing the attachment points for a surface mounted door frame 700 coupled to a wall 710. The door frame includes a sub-buck portion 720 and a shell portion 730, coupled to the sub-buck portion. The sub-buck portion is coupled to the wall at attachment points 740 and 750. The shell portion is coupled to the sub-buck portion at attachment points 760, 770 and 780. The shell portion is not coupled to the wall. The multiple surface wall attachment points 740 and 750 reduce the cantilever effect on the door frame due to torsion and other forces generated by exposure to the heat of a fire, as well as the cantilever effect due to rapid cooling when the hot frame is rapidly cooled by water from a firefighter's hose or a sprinkler system. In addition, the use of separate attachment points for coupling the sub-buck portion to the wall and for coupling the sub-buck portion to the shell portion increases the overall strength and rigidity of the door frame as compared to existing door frames.

REFERENCES

1. American National Standards Institute ANSI/SDI A250, 7-1997, "Nomenclature for Standard Steel Doors and Frames", (1997).
2. Steel Door Institute SDI 118-01, "Basic Fire Door Requirements", available online at www.steeldoor.org/res/118.pdf (2001).
3. Total Door Systems, "Total Door Systems Product Guide", available online at www.totaldoor.com/product-guide/ (2015).
4. National Fire Protection Association "NFPA 80 Standard for Fire Doors and Other Opening Protectives", (2016).
5. National Fire Protection Association "NFPA 105 Standard for Smoke Door Assemblies and Other Opening Protectives", (2016).
6, Greene, L., "Questions About Fire Doors. Everything You Always Wanted to Know", available online at www.constructionspecifier.com/questions-about-fire-doors-everything-you-always-wanted-to-know-but-were-afraid-to-askt (2013).
7. UL, "Fire Doors, GSNV", available online at product-spec.ul.com/document.php?id=GSNV.GuideInfo (2012),
8. Steel Door institute SDI 111-09, "Recommended Details for Standard Steel Doors, Frames, Accessories and Related Components", available online at www.steeldoor.org/res/111.pdf (2014).

What is claimed is:

1. A sub-buck portion of a door frame, consisting of
a sub-buck mounting arm having at least one mounting aperture,
a sub-buck rabbet arm, coupled to one end of the sub-buck mounting arm, and
a sub-buck support arm, coupled to the sub-buck mounting arm opposite the sub-buck rabbet arm,
wherein the sub-buck mounting arm is capable of being surface mounted to a single surface of a wall, and
the sub-buck portion abuts only the single surface of the wall when surface mounted.

2. The sub-buck portion of claim 1, wherein the sub-buck rabbet arm is longer than the sub-buck support arm.

3. The sub-buck portion of claim 2, wherein the sub-buck portion comprises cold rolled steel with a minimum thickness of 18 gauge.

4. The sub-buck portion of claim 1, wherein the sub-buck rabbet arm is the same length as the sub-buck support arm.

5. The sub-buck portion of claim 2, wherein the sub-buck portion comprises cold rolled steel with a thickness of 16 gauge.

6. The sub-buck portion of claim 1, wherein the sub-buck portion comprises cold rolled steel.

7. The sub-buck portion of claim 1, wherein the sub-buck portion comprises cold rolled steel with a minimum thickness of 18 gauge.

8. A shell portion of a door frame, consisting of
a shell support arm,
a facing arm, coupled to the shell support arm,
a shell rabbet arm, coupled to the facing arm,
a stop, coupled to the shell rabbet arm,
a soffit, coupled to the stop,
a return, coupled to the soffit, and
a backbend, coupled to the return,
wherein the shell rabbet arm and the stop define a rabbet, and
the stop and the facing arm extend from the shell rabbet arm in opposite directions.

9. The shell portion of claim 2, wherein the shell comprises a single backbend and a single return.

10. The shell portion of claim 9, wherein the shell portion comprises cold rolled steel with a thickness of at most 21 gauge.

11. The shell portion of claim 9, wherein the shell portion comprises cold rolled steel with a thickness of 16 gauge.

12. The shell portion of claim 8, wherein the shell portion comprises cold rolled steel.

13. The shell portion of claim 8, wherein the shell portion comprises cold rolled steel with a thickness of at most 21 gauge.

14. A sub-buck portion of a door frame, consisting of
a sub-buck mounting arm having at least one mounting aperture,
a sub-buck rabbet arm, coupled to one end of the sub-buck mounting arm, and
a sub-buck support arm, coupled to the sub-buck mounting arm opposite the sub-buck rabbet arm,
wherein the sub-buck portion is capable of being surface mounted to a single surface of a non-protruding wall.

15. The sub-buck portion of claim 14, wherein the sub-buck rabbet arm is longer than the sub-buck support arm.

16. The sub-buck portion of claim 15, wherein the sub-buck portion comprises cold rolled steel with a thickness of 16 gauge.

17. The sub-buck portion of claim 14, wherein the sub-buck portion comprises cold roiled steel with a minimum thickness of 18 gauge.

18. The sub-buck portion of claim 4, wherein the sub-buck portion comprises cold rolled steel with a thickness of 16 gauge.

* * * * *